(12) United States Patent
Mezawa et al.

(10) Patent No.: US 10,675,705 B2
(45) Date of Patent: Jun. 9, 2020

(54) MANUFACTURING MACHINE

(71) Applicant: DMG MORI CO., LTD., Yamatokoriyama-shi (JP)

(72) Inventors: Yuhei Mezawa, Yamatokoriyama (JP); Shigeyuki Takashima, Yamatokoriyama (JP); Takeshi Otawa, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 721 days.

(21) Appl. No.: 15/203,101

(22) Filed: Jul. 6, 2016

(65) Prior Publication Data
US 2017/0008123 A1 Jan. 12, 2017

(30) Foreign Application Priority Data

Jul. 9, 2015 (JP) .................. 2015-137856

(51) Int. Cl.
*B23K 26/342* (2014.01)
*B23K 26/00* (2014.01)
(Continued)

(52) U.S. Cl.
CPC ........ *B23K 26/0093* (2013.01); *B22F 3/1055* (2013.01); *B22F 5/106* (2013.01); *B23K 26/342* (2015.10); *B29C 64/20* (2017.08); *B33Y 40/00* (2014.12); *B22F 2003/1056* (2013.01); *B22F 2003/1059* (2013.01); *B22F 2999/00* (2013.01); *B33Y 30/00* (2014.12); *Y02P 10/295* (2015.11)

(58) Field of Classification Search
CPC .. B23K 26/0093; B23K 26/342; B33Y 40/00; B33Y 30/00; B29C 64/20; B22F 3/1055; B22F 5/106; B22F 2003/1056; B22F 2003/1059; B22F 2999/00
USPC ......................................................... 219/76.1
See application file for complete search history.

(56) References Cited

U.S. PATENT DOCUMENTS 3,311,085 A * 3/1967 Smith .................. B05B 7/1486
118/59
5,418,350 A * 5/1995 Freneaux ................ B05B 7/228
219/121.64
(Continued)

FOREIGN PATENT DOCUMENTS

JP  2004-314168    11/2004
JP  2005-335199 A  12/2005
(Continued)

*Primary Examiner* — Chee-Chong Lee
(74) *Attorney, Agent, or Firm* — Oblon, McClelland, Maier & Neustadt, L.L.P.

(57) ABSTRACT

A manufacturing machine is a manufacturing machine capable of additive manufacturing. The manufacturing machine includes: an additive-manufacturing head configured to be movable in a machining area and to discharge material powder toward a workpiece and irradiate the workpiece with an energy beam; and a powder chute configured to be movable in the machining area and to receive material powder discharged from the additive-manufacturing head toward the workpiece and failing to attach to the workpiece. There is provided the manufacturing machine configured in the above-described manner to be capable of efficiently collecting material powder having failed to attach to the workpiece during additive manufacturing.

5 Claims, 8 Drawing Sheets (51) Int. Cl.
*B33Y 40/00* (2020.01)
*B22F 3/105* (2006.01)
*B29C 64/20* (2017.01)
*B22F 5/10* (2006.01)
*B33Y 30/00* (2015.01)

(56) References Cited

U.S. PATENT DOCUMENTS

| | | | | | |
|---|---|---|---|---|---|
| 5,449,536 | A | * | 9/1995 | Funkhouser | C23C 4/12 427/597 |
| 5,477,026 | A | * | 12/1995 | Buongiorno | B23K 26/144 219/121.64 |
| 5,647,931 | A | * | 7/1997 | Retallick | B22F 3/004 156/273.3 |
| 2009/0169664 | A1 | * | 7/2009 | Cox | B01F 3/188 425/174.4 |

FOREIGN PATENT DOCUMENTS

| JP | 2012-206137 | | 10/2012 |
|---|---|---|---|
| JP | 2014-125643 | A | 7/2014 |

* cited by examiner

MANUFACTURING MACHINE

BACKGROUND OF THE INVENTION

Field of the Invention

The present invention generally relates to a manufacturing machine, and specifically relates to a manufacturing machine capable of additive manufacturing.

Description of the Background Art

Regarding the conventional manufacturing machine, Japanese Patent Laying-Open No. 2004-314168 for example discloses a laser cladding apparatus for pump equipment, aiming at quick and accurate cladding without causing cracks in a base material. The laser cladding apparatus disclosed in Japanese Patent Laying-Open No. 2004-314168 includes a powder feeder which feeds a metal material (powder) with argon gas as a carrier gas, a swirl-type powder feeding nozzle which uniformly mixes the fed metal material with the argon gas and simultaneously uses a gas mixture of argon and nitrogen as a shielding gas, and a multi-axis robot which moves the swirl-type powder feeding nozzle.

Japanese Patent Laying-Open No. 2012-206137 discloses a repairing apparatus aiming at easy cladding welding without requiring human assistance. The repairing apparatus disclosed in Japanese Patent Laying-Open No. 2012-206137 includes a material feeding unit, a laser apparatus which applies a laser spot beam, and a welding robot which has a multi-joint arm and moves the laser spot beam in three-dimensional directions.

SUMMARY OF THE INVENTION

Creation of a three-dimensional form on a workpiece by attaching materials on the workpiece is implemented by a method of additive manufacturing (AM). In contrast, creation of a three-dimensional form on a workpiece by subtracting materials is implemented by a method of subtractive manufacturing (SM). In the case of additive manufacturing, the mass of the workpiece after additive manufacturing has been increased relative to the workpiece before additive manufacturing. In the case of subtractive manufacturing, the mass of the workpiece after subtractive manufacturing has been decreased relative to the workpiece before subtractive manufacturing.

An example of the additive manufacturing method is a directed energy deposition method. According to the directed energy deposition method, material powder is discharged toward a workpiece and the workpiece is irradiated with an energy beam. However, because it is inevitable that some of the material powder discharged toward the workpiece fails to attach to the workpiece, it is necessary to efficiently collect such material powder.

An object of the present invention is to solve the above-described problem and provide a manufacturing machine capable of efficiently collecting material powder having failed to attach to the workpiece during additive manufacturing.

A manufacturing machine according to the present invention is a manufacturing machine capable of additive manufacturing. The manufacturing machine includes: an additive-manufacturing head configured to be movable in a machining area and to discharge material powder toward a workpiece and irradiate the workpiece with an energy beam; and a material powder receiver configured to be movable in the machining area and to receive material powder discharged from the additive-manufacturing head toward the workpiece and failing to attach to the workpiece.

In accordance with the present invention, a manufacturing machine capable of efficiently collecting material powder having failed to attach to the workpiece during additive manufacturing can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described with reference to the drawings. In the drawings referenced below, the same or corresponding members are denoted by the same numerals.

Figure 1:
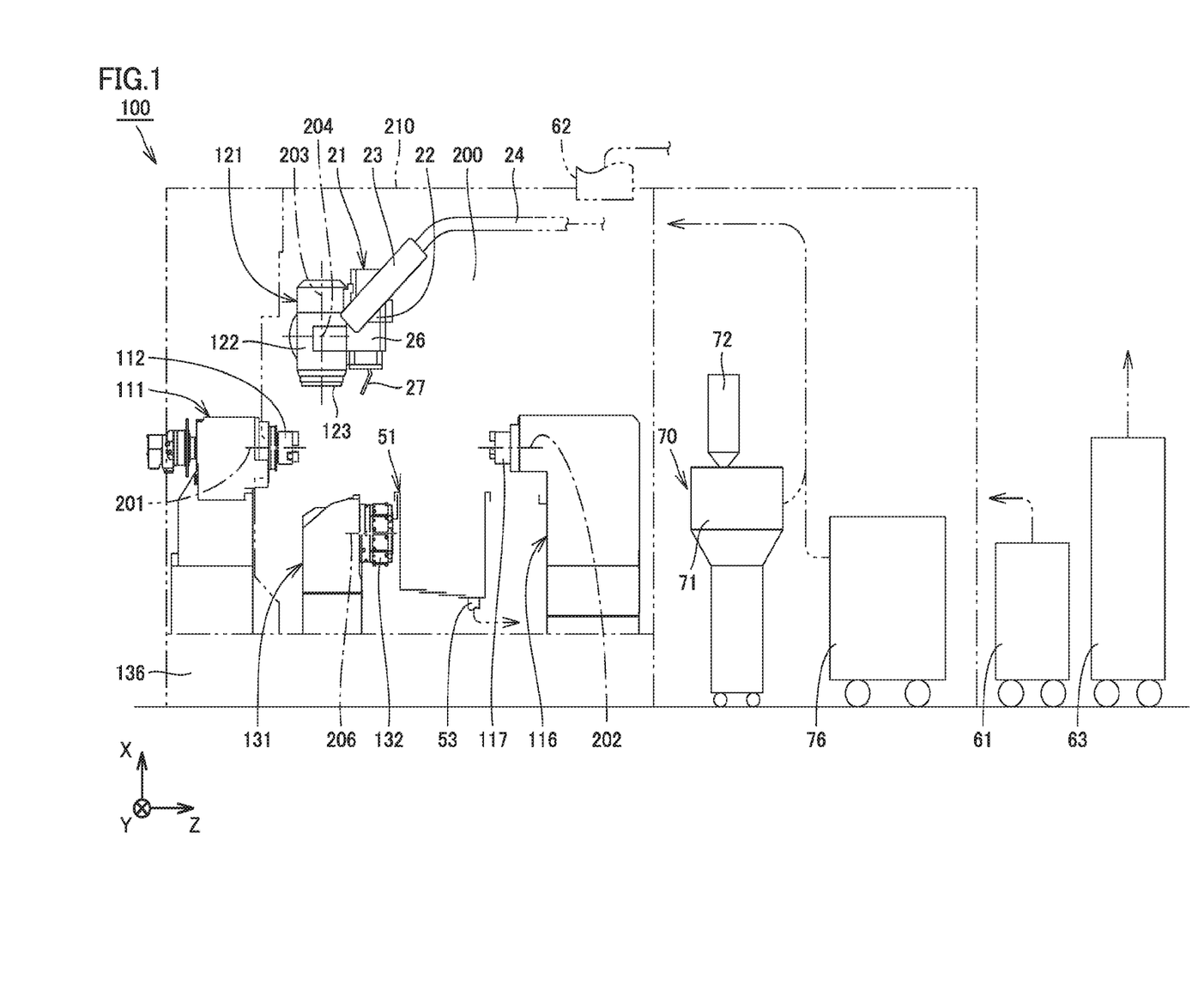
FIG. 1 is a front view showing a manufacturing machine in an embodiment of the present invention.
Figure 2:
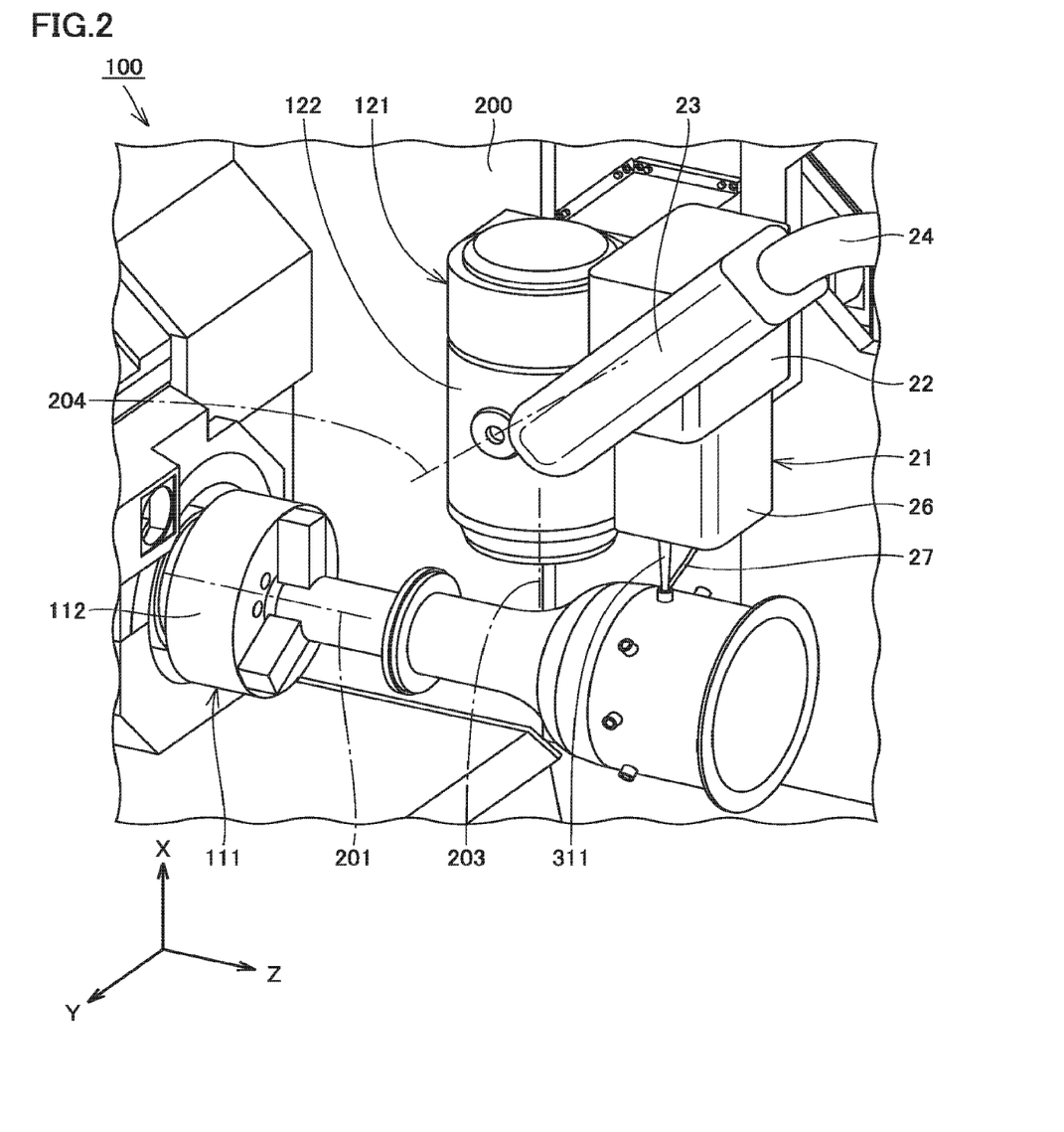
FIG. 2 is a perspective view showing an inside of a machining area during additive manufacturing in the manufacturing machine in FIG. 1.

FIG. 1 is a front view showing a manufacturing machine in an embodiment of the present invention. In FIG. 1, a cover body which presents the appearance of the manufacturing machine is shown as if it is transparent, so that the inside of the manufacturing machine is visible. FIG. 2 is a perspective view showing an inside of a machining area during additive manufacturing in the manufacturing machine in FIG. 1.

Referring to FIGS. 1 and 2, manufacturing machine 100 is an AM/SM hybrid manufacturing machine capable of additive manufacturing for a workpiece and subtractive manufacturing for a workpiece. Manufacturing machine 100 has a turning function by means of a stationary tool and a milling function by means of a rotary tool, as functions of SM.

First, a description will be given of the overall structure of manufacturing machine 100. Manufacturing machine 100 includes a bed 136, a first headstock 111, a second headstock 116, a tool spindle 121, and a lower tool rest 131.

Bed 136 is a base member for supporting first headstock 111, second headstock 116, tool spindle 121, and lower tool rest 131, and mounted on an installation surface in a factory or the like. First headstock 111, second headstock 116, tool spindle 121, and lower tool rest 131 are provided in a machining area 200 defined by a splashguard 210.

First headstock 111 and second headstock 116 are disposed to face each other in a z-axis direction which extends horizontally. First headstock 111 and second headstock 116 have a first spindle 112 and a second spindle 117, respectively, for rotating a workpiece in a turning process which is performed by means of a stationary tool. First spindle 112 is provided rotatably about a central axis 201 which is in parallel with the z axis. Second spindle 117 is provided rotatably about a central axis 202 which is in parallel with the z axis. First spindle 112 and second spindle 117 are each provided with a chuck mechanism for detachably holding a workpiece.

Second headstock 116 is configured to be movable in the z-axis direction by means of any of various feed mechanisms, guide mechanisms, a servo motor, and the like.

Tool spindle (upper tool rest) 121 causes a rotary tool to rotate in a milling process which is performed by means of the rotary tool. Tool spindle 121 is provided rotatably about a central axis 203 which is in parallel with an x axis extending vertically. Tool spindle 121 is provided with a clamp mechanism for detachably holding the rotary tool.

Tool spindle 121 is supported above bed 136 through a column or the like (not shown). Tool spindle 121 is configured to be movable, by any of various feed mechanisms, guide mechanisms, a servo motor, and the like provided on the column or the like, in the x-axis direction, a y-axis direction which extends horizontally and orthogonally to the z-axis direction, and the z-axis direction. The position of machining by the rotary tool attached to tool spindle 121 moves three-dimensionally. Further, tool spindle 121 is configured to be swivelable about a central axis 204 which is in parallel with the y axis.

Although not shown in FIG. 1, an automatic tool-change device for automatically changing a tool attached to tool spindle 121 and a tool magazine storing replacement tools to be attached to tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is configured to be swivelable about a central axis 206 which is in parallel with the z axis. At positions located at intervals in the direction of the circumference centered at central axis 206, tool holders for holding stationary tools are attached. Swivel unit 132 swivels about central axis 206 to thereby circumferentially move the stationary tools held by the tool holders, and a stationary tool to be used for turning is indexed.

Lower tool rest 131 is supported above bed 136 through a saddle or the like (not shown). Lower tool rest 131 is configured to be movable in the x-axis direction and the z-axis direction, by any of various feed mechanisms, guide mechanisms, a servo motor, and the like provided on the saddle or the like.

Manufacturing machine 100 further includes an additive-manufacturing head 21. Additive-manufacturing head 21 performs additive manufacturing (directed energy deposition) by discharging material powder toward a workpiece and irradiating the workpiece with an energy beam. Typical energy beams are laser beam and electron beam. In the present embodiment, a laser beam is used for additive manufacturing.

Additive-manufacturing head 21 includes a head body (body) 22, a laser tool (emission unit) 26, and a cable joint 23.

A laser beam and material powder are introduced into head body 22. Laser tool 26 emits the laser beam toward a workpiece and defines a laser beam irradiation region on the workpiece. The material powder introduced into additive-manufacturing head 21 is discharged through a nozzle unit 27 toward the workpiece. Cable joint 23 is provided as a joint for connecting a cable 24, which will be described later herein, to head body 22.

Manufacturing machine 100 further includes a material powder feeder 70, a laser oscillator 76, cable 24, and a fume collector 63.

Material powder feeder 70 feeds material powder to be used for additive manufacturing, toward additive-manufacturing head 21. Material powder feeder 70 includes a material powder tank 72 storing material powder to be used for additive manufacturing, and a mixing unit 71 mixing the material powder with a carrier gas. Laser oscillator 76 generates a laser beam to be used for additive manufacturing.

Cable 24 is made up of an optical fiber for directing the laser beam from laser oscillator 76 toward additive-manufacturing head 21, pipes for directing the material powder from material powder feeder 70 toward additive-manufacturing head 21, and a tube member which encloses the pipes.

In machining area 200 when additive manufacturing is performed, a metal constituting the material powder is evaporated to generate a fume in which particles of 1 μm or less are floating. Fume collector 63 collects the fume from inside machining area 200 through a duct 62 which opens toward machining area 200.

Figure 3:
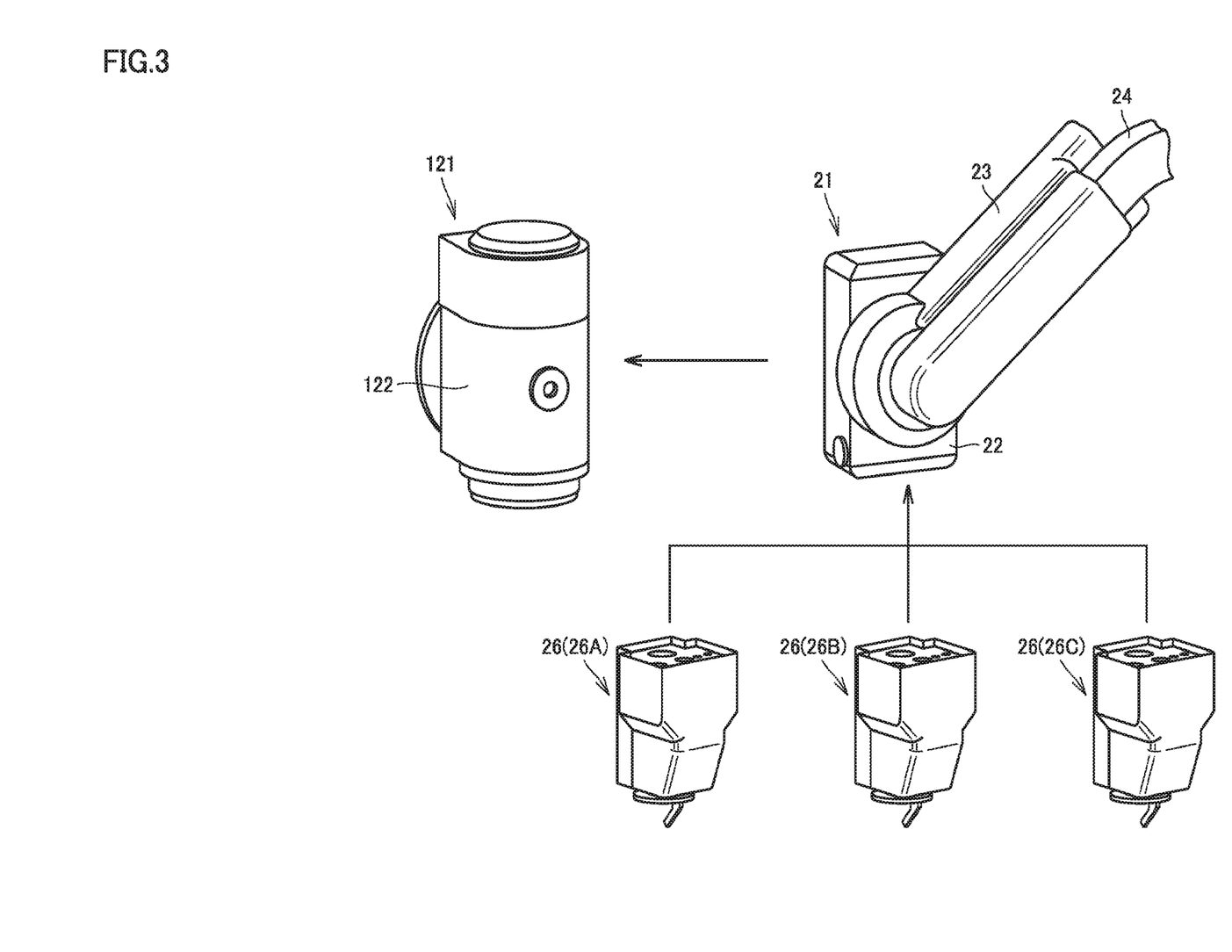
FIG. 3 is a diagram showing a state in which an additive-manufacturing head is attached to a tool spindle.

FIG. 3 is a diagram showing a state in which the additive-manufacturing head is attached to the tool spindle. Referring to FIGS. 1 to 3, additive-manufacturing head 21 is configured to be attachable to and detachable from tool spindle 121. Head body 22 of additive-manufacturing head 21 is configured to be attachable to and detachable from tool spindle 121.

When additive manufacturing is performed, additive-manufacturing head 21 is attached to tool spindle 121. Tool spindle 121 moves in the x-axis direction, the y-axis direction, and the z-axis direction to thereby three-dimensionally displace the position of additive manufacturing by additive-manufacturing head 21. When subtractive manufacturing is performed, additive-manufacturing head 21 is separated from tool spindle 121 and stored in a head stocker (not shown).

Tool spindle 121 is provided with a clamp mechanism. When additive-manufacturing head 21 is attached to tool spindle 121, the clamp mechanism operates to couple additive-manufacturing head 21 to tool spindle 121. An example of the clamp mechanism may be a mechanism obtaining a clamping state through a spring force and obtaining an unclamping state through a hydraulic pressure.

Further, in the present embodiment, any one of a plurality of laser tools 26 (in FIG. 3, a laser tool 26A, a laser tool 26B, and a laser tool 26C) is selectively attached to head body 22, depending on conditions of additive manufacturing to be performed. A plurality of laser tools 26 differ from each other in shape and/or size of a laser beam irradiation region to be defined on a workpiece.

Figure 4:
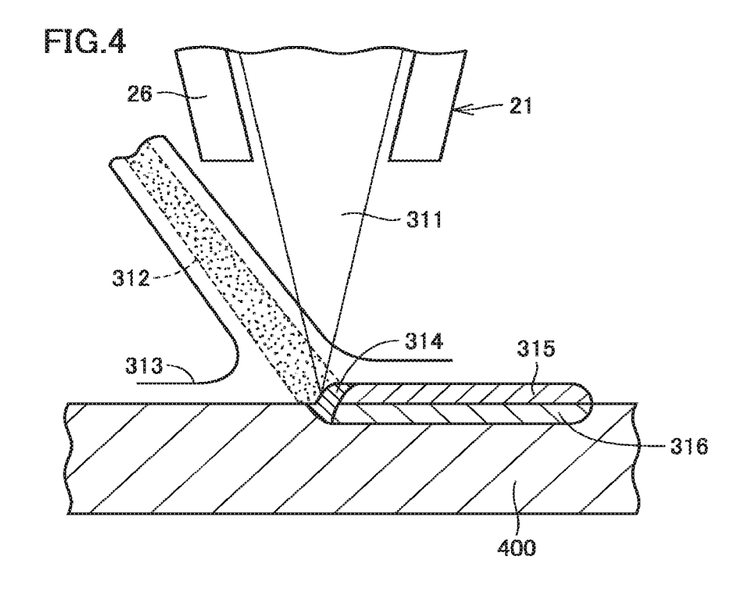
FIG. 4 is a cross-sectional view showing, in an enlarged form, a surface of a workpiece during additive manufacturing.

FIG. 4 is a cross-sectional view showing, in an enlarged form, a surface of a workpiece during additive manufacturing. Referring to FIGS. 2 and 4, when additive manufacturing is performed, movement of tool spindle 121 to which additive-manufacturing head 21 is attached and/or rotation of first spindle 112 of first headstock 111 which holds a workpiece 400 cause additive-manufacturing head 21 and workpiece 400 to move relative to each other with laser tool 26 facing workpiece 400. At this time, from additive-manufacturing head 21 (laser tool 26) toward workpiece 400, a laser beam 311, material powder 312, and shielding and carrier gas 313 are discharged. Accordingly, a melted point 314 is formed on the surface of workpiece 400 and consequently material powder 312 is melted and attached.

Specifically, a cladding layer 316 is formed on the surface of workpiece 400. On cladding layer 316, a cladding material 315 is deposited. When cladding material 315 is cooled, a state in which a machinable layer is formed on the surface of workpiece 400 is generated. As the material powder, any of metal powder of aluminum alloy and magnesium alloy and the like and ceramic powder may be used.

Figure 5:
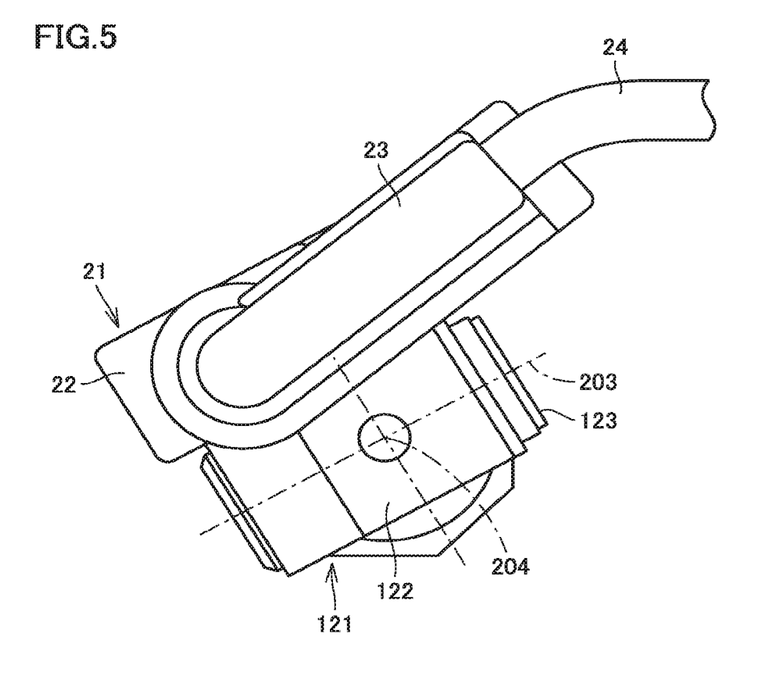
FIG. 5 is a diagram for illustrating a swivelable range of a tool spindle in FIG. 1.

FIG. 5 is a diagram for illustrating a swivelable range of the tool spindle in FIG. 1. Referring to FIG. 5, tool spindle 121 is configured to be swivelable about central axis 204. The swivelable range of tool spindle 121 is a range of ±120° with respect to a posture of tool spindle 121 in which a spindle end face of tool spindle 121 faces downward (the posture shown in FIG. 1). In FIG. 5, tool spindle 121 swiveled by an angle of +120° from the posture shown in FIG. 1 is shown. The swivelable range of tool spindle 121 is preferably a range of ±90° or more from the posture shown in FIG. 1.

During additive manufacturing in which additive-manufacturing head 21 is attached to tool spindle 121, swiveling of tool spindle 121 causes additive-manufacturing head 21 to swivel as well together with tool spindle 121. Thus, the direction of additive manufacturing by additive-manufacturing head 21 (the direction in which a laser beam is applied to the workpiece) can freely be changed.

Subsequently, a description will be given of a material powder collection mechanism provided in manufacturing machine 100 in FIG. 1.

Figure 6:
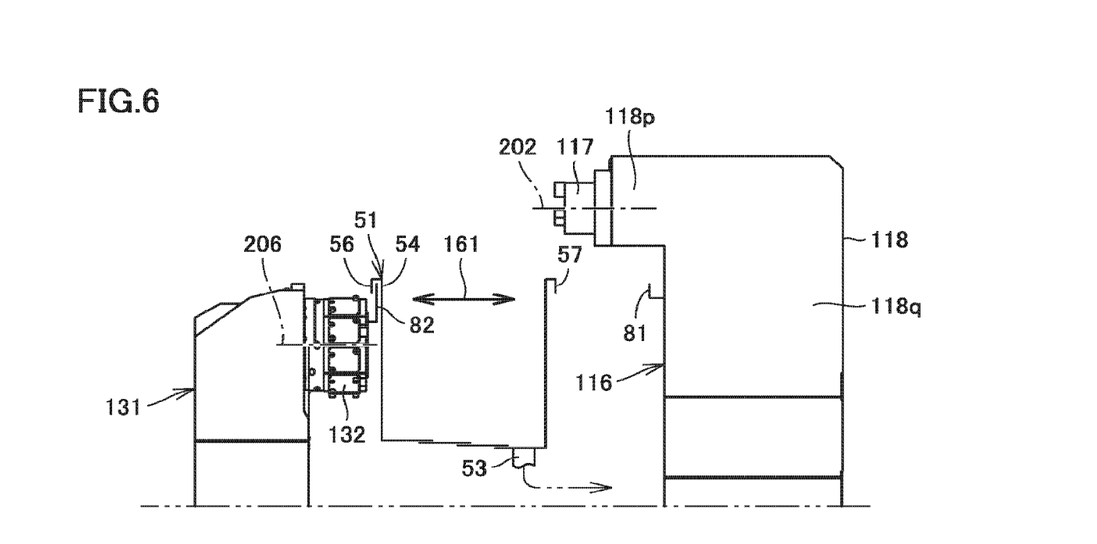
FIG. 6 is a diagram showing, in a partially enlarged form, the inside of the machining area of the manufacturing machine in FIG. 1.

FIG. 6 is a diagram showing, in a partially enlarged form, the inside of the machining area of the manufacturing machine in FIG. 1. Referring to FIGS. 1 and 6, manufacturing machine 100 further includes a powder chute 51 serving as a material powder receiver, and a powder collector 61 serving as a material powder collector. Powder chute 51 receives material powder having been discharged from additive-manufacturing head 21 toward the workpiece and having failed to attach to the workpiece during additive manufacturing. Powder collector 61 collects the material powder received in powder chute 51 from the inside of machining area 200 to the outside of the machine.

Powder chute 51 has a shape of a casing capable of receiving material powder. Powder chute 51 has an opening 54 which opens upward in the vertical direction.

Powder chute 51 is disposed below a movable range of additive-manufacturing head 21 in machining area 200. Powder chute 51 is disposed below central axis 201 which is the rotational center of first spindle 112 and central axis 202 which is the rotational center of second spindle 117. Powder chute 51 is disposed between lower tool rest 131 (swivel unit 132) and second headstock 116 in the z-axis direction.

Powder collector 61 is installed outside manufacturing machine 100. Powder collector 61 and powder chute 51 are connected by a pipe 53. Suction by powder collector 61 causes material powder received in powder chute 51 to be collected into powder collector 61 through pipe 53.

Powder chute 51 is configured to be movable in machining area 200. In the present embodiment, powder chute 51 is made movable in machining area 200 by being coupled to at least one of lower tool rest 131 and second headstock 116.

More specifically, powder chute 51 has an engagement portion 56 as a coupling mechanism to lower tool rest 131, and has an engagement portion 57 as a coupling mechanism to second headstock 116. Engagement portion 56 is located to face lower tool rest 131 in the z-axis direction, and engagement portion 57 is located to face second headstock 116 in the z-axis direction.

Lower tool rest 131 has an engagement portion 82 which can be engaged with engagement portion 56. Engagement portion 56 and engagement portion 82 are configured to become an engaged state by approach of lower tool rest 131 and powder chute 51 to each other in the z-axis direction, and a disengaged state by separation of lower tool rest 131 and powder chute 51 from each other in the z-axis direction. As engagement portion 56 and engagement portion 82 are engaged with each other, powder chute 51 is coupled to lower tool rest 131.

Engagement portion 82 is disposed on swivel unit 132. The position where engagement portion 82 is disposed on swivel unit 132 is not particularly limited. As long as engagement portion 82 is disposed at a position which remains the same while swivel unit 132 swivels (at the axial center of central axis 206), the stationary tool can be indexed even while powder chute 51 is coupled to lower tool rest 131.

Second headstock 116 has an engagement portion 81 which can be engaged with engagement portion 57. Engagement portion 57 and engagement portion 81 are configured to become an engaged state by approach of second headstock 116 and powder chute 51 to each other in the z-axis direction, and a disengaged state by separation of second headstock 116 and powder chute 51 from each other in the z-axis direction. As engagement portion 57 and engagement portion 81 are engaged with each other, powder chute 51 is coupled to second headstock 116.

Second headstock 116 further has a pedestal 118 supporting second spindle 117. Pedestal 118 is disposed to support second spindle 117 at a position located above at a distance from a floor portion of machining area 200. Pedestal 118 has, as its constituent parts, a neck portion 118$p$ and a base portion 118$q$. Base portion 118$q$ is disposed to extend vertically upward from the floor portion of machining area 200. Neck portion 118$p$ is disposed to protrude from base portion 118$q$ in the z-axis direction. Second spindle 117 protrudes from neck portion 118$p$ in the z-axis direction. Engagement portion 81 is disposed on base portion 118$q$ and located directly below neck portion 118$p$.

In such a configuration, powder chute 51 can be coupled to at least one of lower tool rest 131 and second headstock 116 to thereby move in the z-axis direction in machining area 200.

Further, in the present embodiment, powder chute 51 is configured to be deformable between a first state of forming opening 54 which opens toward machining area 200 and a second state in which an opening area of opening 54 is smaller than that in the first state.

More specifically, powder chute 51 is formed of a telescopic cover capable of expanding and contracting in the z-axis direction (the direction indicated by an arrow 161 in FIG. 6). In a state where powder chute 51 is coupled to lower tool rest 131 and coupled to second headstock 116, separation of lower tool rest 131 and powder chute 51 from each other in the z-axis direction causes the first state in which the opening area of opening 54 is increased, and approach of lower tool rest 131 and powder chute 51 to each other in the z-axis direction causes the second state in which the opening area of opening 54 is decreased.

It should be noted that powder chute 51 is not limited to the mechanism of the telescopic cover capable of expanding and contracting, and powder chute 51 may be a mechanism which is foldable about the bottom portion to thereby implement a structure of changing the opening area of opening 54.

An angle of repose is an indicator of the fluidity of material powder. The angle of repose is the maximum angle, relative to the horizontal plane, at which a surface layer of material powder can keep a resting state. In the case where a mechanism which is foldable about the bottom portion is used as powder chute 51, the angle between the inclined surface of powder chute 51 and the horizontal plane can be set larger than the angle of repose of the material powder to allow the material powder to move more smoothly toward the bottom portion without staying on the inclined surface of powder chute 51. Accordingly, regardless of the magnitude of the suction force applied by powder collector 61, material powder received in powder chute 51 can be collected efficiently into powder collector 61.

Subsequently, a description will be given of a form in use of powder chute 51 in FIG. 6.

Figure 7:
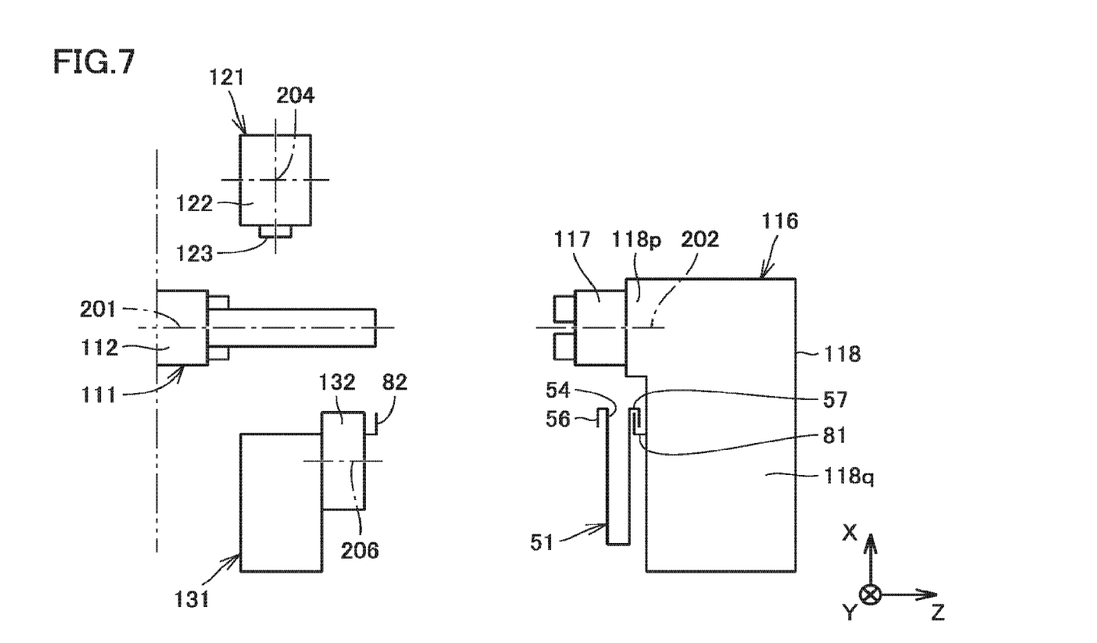
FIG. 7 is a diagram schematically showing a form of a powder chute during subtracting manufacturing.
Figure 8:
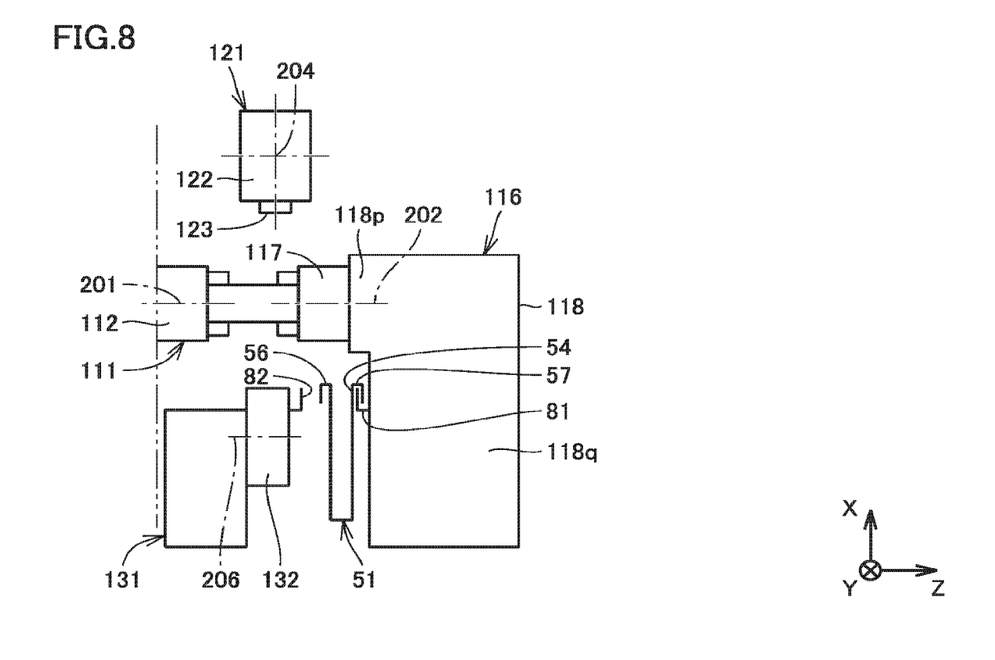
FIG. 8 is a diagram schematically showing a form of the powder chute during subtracting manufacturing.

FIGS. 7 and 8 are each a diagram schematically showing a form of the powder chute during subtracting manufacturing. Referring to FIGS. 7 and 8, during subtractive manufacturing, powder chute 51 is held below second spindle 117.

More specifically, during subtractive manufacturing, powder chute 51 is coupled to second headstock 116 to become a state of being non-coupled to lower tool rest 131. During subtractive manufacturing, powder chute 51 is in the second state in which the opening area of opening 54 is reduced. Powder chute 51 is held below second spindle 117 and located to be adjacent to pedestal 118 (base portion 118$q$) in the horizontal direction. Powder chute 51 may be disposed directly below neck portion 118$p$ of pedestal 118.

In such a configuration, powder chute 51 is held below second spindle 117 during subtractive manufacturing, and therefore, powder chute 51 can be prevented from hindering subtractive manufacturing. For example, during subtractive manufacturing, while lower tool rest 131 to which a stationary tool is attached is moved in the z-axis direction and the x-axis direction depending on the position of machining, powder chute 51 can be prevented from hindering movement of lower tool rest 131. Moreover, as shown in FIG. 8, in the case where a workpiece is passed between first spindle 112 and second spindle 117, lower tool rest 131 and second headstock 116 approach each other in the z-axis direction. Even in such a case, the workpiece can be passed therebetween without allowing lower tool rest 131 (the stationary tool attached to lower tool rest 131) to interfere with powder chute 51.

Moreover, there may occur a phenomenon in which the temperature of material powder increases as a liquid is mixed into the material powder. In the present embodiment, powder chute 51 is set in the second state in which the opening area of opening 54 is reduced during subtractive manufacturing, and therefore, a coolant (liquid) supplied to machining area 200 can be prevented from entering powder chute 51.

In order to more reliably prevent the coolant from entering powder chute 51, a lid member may separately be provided to close opening 54 of powder chute 51.

Figure 9:
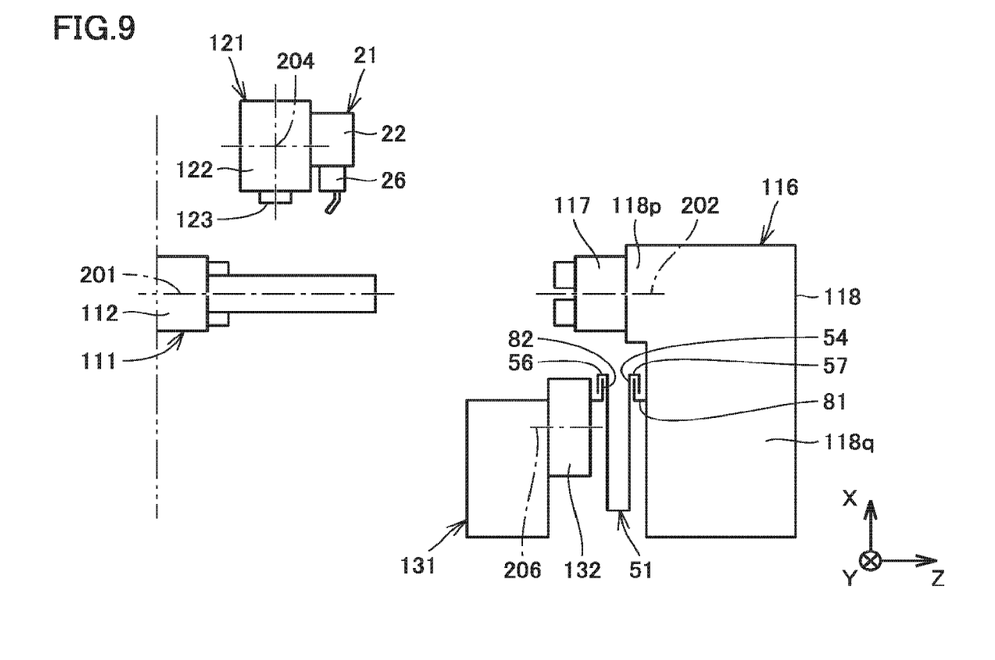
FIG. 9 is a diagram schematically showing a form of the powder chute during additive manufacturing.

FIGS. 9 to 13 are each a diagram schematically showing a form of the powder chute during additive manufacturing. Referring to FIG. 9, when a shift is made from subtractive manufacturing to additive manufacturing, lower tool rest 131 is moved to approach second headstock 116 to thereby couple powder chute 51 to both second headstock 116 and lower tool rest 131.

Figure 10:
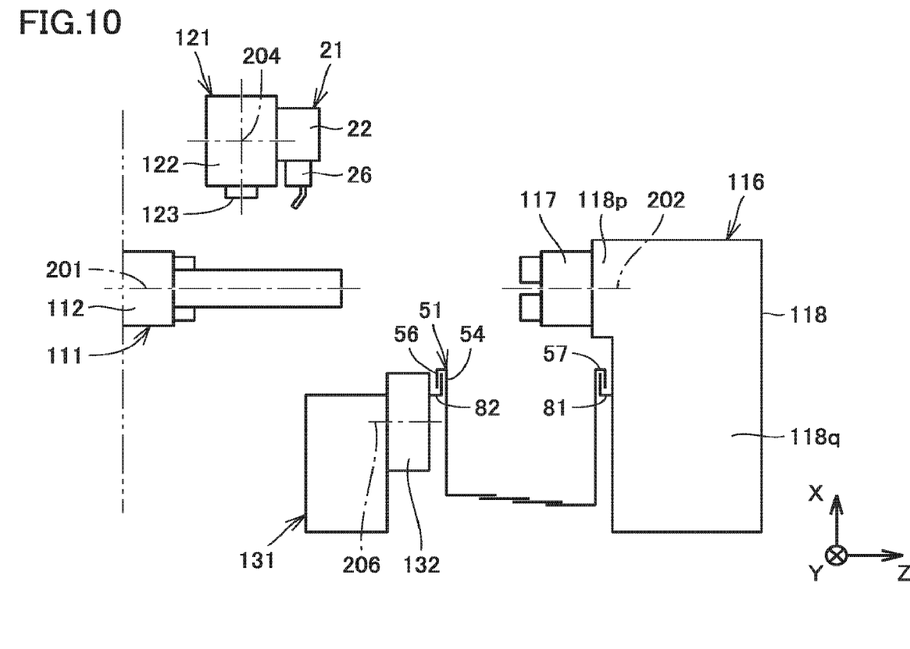
FIG. 10 is a diagram schematically showing a form of the powder chute during additive manufacturing.

Referring to FIG. 10, in the state where powder chute 51 is coupled to lower tool rest 131 and second headstock 116, lower tool rest 131 is moved away from second headstock 116 to thereby set powder chute 51 in the first state in which the opening area of opening 54 is increased.

Figure 11:
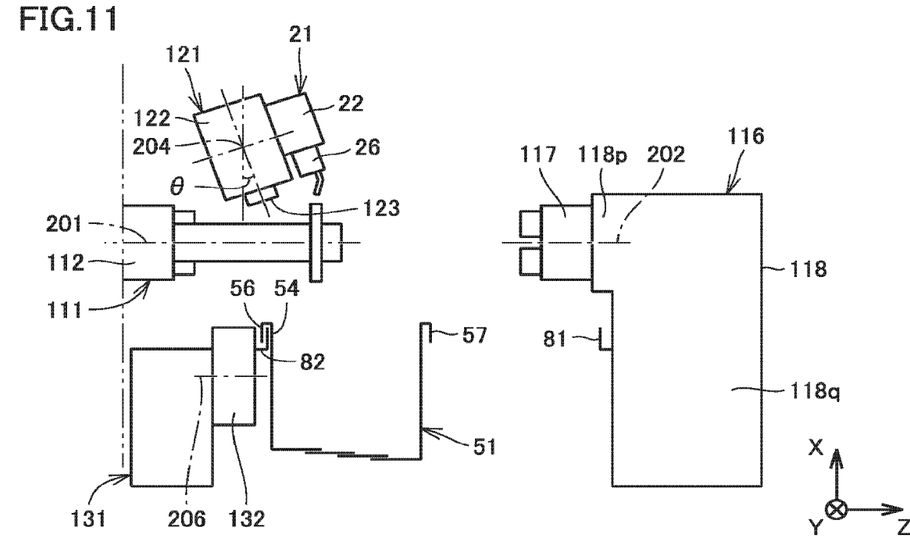
FIG. 11 is a diagram schematically showing a form of the powder chute during additive manufacturing.

Referring to FIG. 11, coupling between powder chute 51 and second headstock 116 is released. Lower tool rest 131 is moved in the z-axis direction to locate powder chute 51 at a position most suitable for receiving material powder. At this time, the position of additive-manufacturing head 21 in the z-axis direction and the inclination of additive-manufacturing head 21 (swivel angle θ of tool spindle 121) are taken into consideration to determine the position of powder chute 51. Further, the position of additive-manufacturing head 21 in the x-axis direction (height direction), the shape of a workpiece, the site of the workpiece to be subjected to additive manufacturing, and the like may be taken into consideration to determine the position of powder chute 51. The position of powder chute 51 may be changed as additive manufacturing proceeds, so that powder chute 51 is kept at a position most suitable for receiving material powder.

Figure 12:
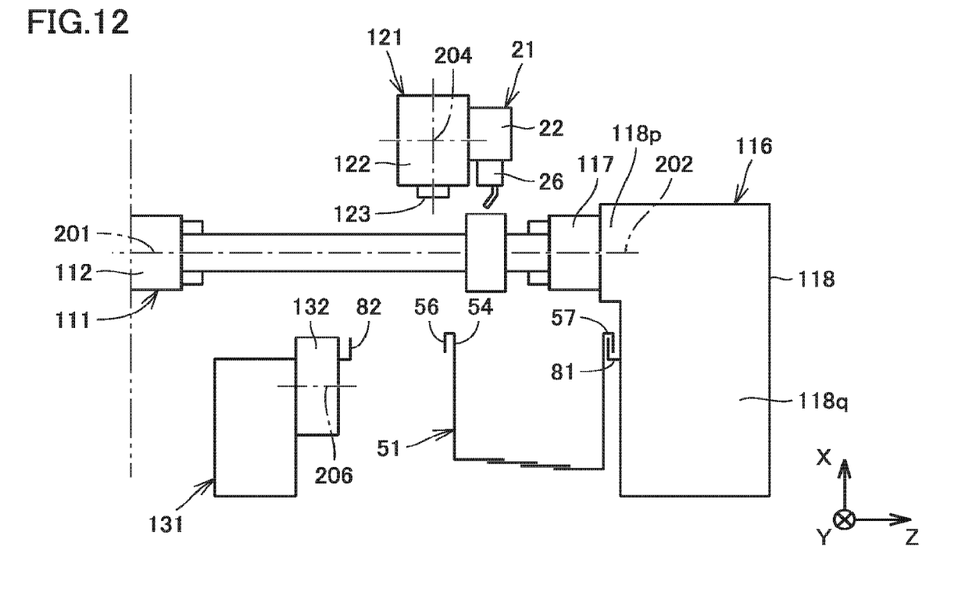
FIG. 12 is a diagram schematically showing a form of the powder chute during additive manufacturing.

Referring to FIG. 12, during additive manufacturing, powder chute 51 may be coupled to second headstock 116. In the case for example where a workpiece is held on second spindle 117 and additive manufacturing is performed at a position close to second spindle 117, material powder having failed to attach to the workpiece can efficiently be collected.

Figure 13:
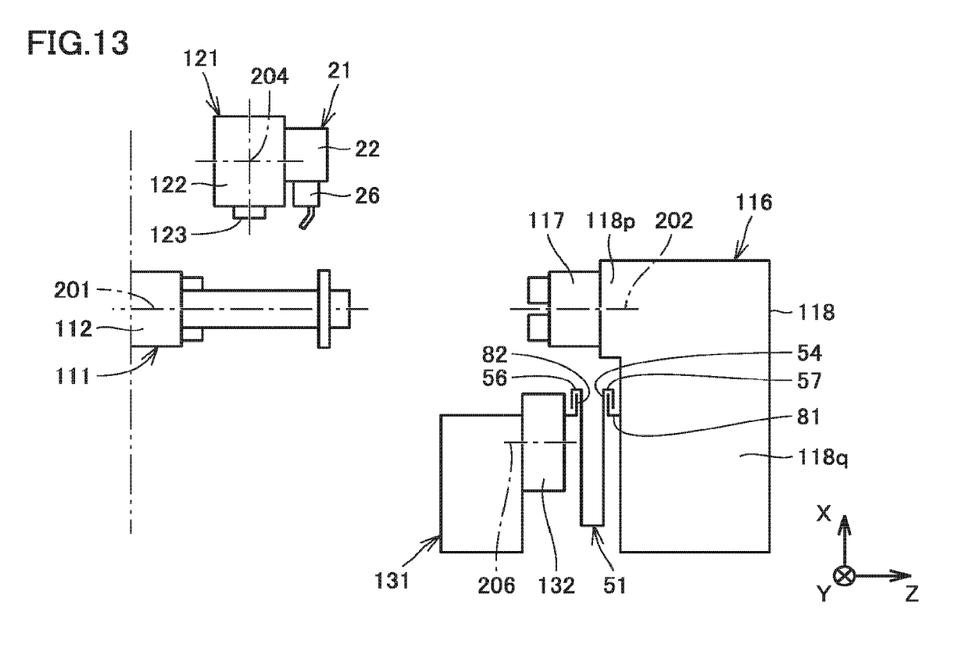
FIG. 13 is a diagram schematically showing a form of the powder chute during additive manufacturing.

Referring to FIG. 13, when additive manufacturing is completed, lower tool rest 131 is moved to approach second headstock 116. Accordingly, powder chute 51 is deformed into the second state in which the opening area of opening 54 is reduced and powder chute 51 is held below second spindle 117.

The following is a summary of the above-described structure of the manufacturing machine in the embodiment of the present invention. Manufacturing machine 100 in the present embodiment is a manufacturing machine capable of additive manufacturing. Manufacturing machine 100 includes:

additive-manufacturing head 21 configured to be movable in machining area 200 and discharge material powder toward a workpiece and irradiate the workpiece with an energy beam; and powder chute 51 configured to be movable in machining area 200 and receive material powder discharged from additive-manufacturing head 21 toward the workpiece and failing to attach to the workpiece.

In manufacturing machine 100 in the embodiment of the present invention configured as described above, powder chute 51 can be moved depending on conditions of additive manufacturing which is being performed (the position of additive-manufacturing head 21, the direction in which material powder is discharged, for example) to thereby efficiently collect, by means of powder chute 51, material powder having failed to attach to the workpiece during additive manufacturing.

While the above description in connection with the present embodiment is about the case where powder chute 51 is coupled to lower tool rest 131 and/or second headstock 116, the object to which the material powder receiver of the present invention is to be coupled is not limited to them. In the case for example where the manufacturing machine of the present invention is an AM/SM hybrid manufacturing machine including a machining center as a base component, the material powder receiver may be coupled to a table provided for holding a workpiece. Depending on the object to which the material powder receiver is to be coupled, the material powder receiver may also be movable in the height direction for example.

While the above description in connection with the present embodiment is about manufacturing machine 100 capable of additive manufacturing and subtractive manufacturing, the present invention is also applicable to a manufacturing machine capable of additive manufacturing only. In this case, a movement mechanism unit may separately be provided for moving the material powder receiver in the machining area.

A manufacturing machine according to the present invention is a manufacturing machine capable of additive manufacturing. The manufacturing machine includes: an additive-manufacturing head configured to be movable in a machining area and to discharge material powder toward a workpiece and irradiate the workpiece with an energy beam; and a material powder receiver configured to be movable in the machining area and to receive material powder discharged from the additive-manufacturing head toward the workpiece and failing to attach to the workpiece.

In the manufacturing machine configured in the above-described manner, the material powder receiver can be configured to be movable in the machining area to thereby efficiently collect material powder having failed to attach to the workpiece during additive manufacturing.

Preferably, the manufacturing machine is capable of subtractive manufacturing in addition to additive manufacturing. The manufacturing machine further includes: a tool holder configured to be movable in the machining area and to hold a tool for subtractive manufacturing for a workpiece; and a workpiece holder configured to be movable in the machining area and to hold a workpiece. The material powder receiver is made movable in the machining area by being coupled to at least one of the tool holder and the workpiece holder.

In the manufacturing machine configured in the above-described manner, at least one of the tool holder and the workpiece holder can be used to move the material powder receiver in the machining area.

Preferably, the manufacturing machine is capable of subtractive manufacturing in addition to additive manufacturing. The material powder receiver is configured to be deformable between a first state of forming an opening which opens toward an inside of the machining area and a second state in which an opening area of the opening is smaller than an opening area of the opening in the first state.

In the manufacturing machine configured in the above-described manner, the material powder receiver can be deformed into a state suitable for additive manufacturing and a state suitable for subtractive manufacturing.

Preferably, the manufacturing machine further includes: a tool holder configured to be movable in the machining area and to hold a tool for subtractive manufacturing for a workpiece; and a workpiece holder configured to be movable in the machining area and to hold a workpiece. The material powder receiver is coupled to the tool holder and the workpiece holder and deformed between the first state and the second state in accordance with movement of at least one of the tool holder and the workpiece holder.

In the manufacturing machine configured in the above-described manner, the tool holder and the workpiece holder can be used to deform the material powder receiver between the first state and the second state.

Preferably, the manufacturing machine is capable of subtractive manufacturing in addition to additive manufacturing. The manufacturing machine further includes a headstock. The headstock includes: a spindle having a rotational axis extending in a horizontal direction, the spindle holding a workpiece rotatably about the rotational axis; and a pedestal supporting the spindle. The material powder receiver is held below the spindle during subtractive manufacturing.

In the manufacturing machine configured in the above-described manner, the material powder receiver can be retracted from a position at which the material powder receiver may hinder subtractive manufacturing during subtractive manufacturing.

The present invention is applied to a manufacturing machine capable of additive manufacturing for a workpiece.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A manufacturing machine capable of additive manufacturing and subtractive manufacturing, the manufacturing machine comprising:
   a splashguard defining a machining area;
   an additive-manufacturing head configured to be movable in the machining area and to discharge material powder toward a workpiece and irradiate the workpiece with an energy beam;
   a powder chute having an opening which opens in the machining area, the powder chute being configured to be movable in the machining area and to receive material powder through the opening, the material powder being discharged from the additive-manufacturing head toward the workpiece and failing to attach to the workpiece;
   a tool holder configured to be movable in the machining area and to hold a tool for subtractive manufacturing for the workpiece; and
   a workpiece holder configured to be movable in the machining area and to hold the workpiece, and
   the powder chute being movable in the machining area by being coupled to at least one of the tool holder and the workpiece holder.

2. The manufacturing machine according to claim 1, wherein
   the powder chute is configured to be deformable between a first state of forming an opening which opens toward an inside of the machining area and a second state in which an opening area of the opening is smaller than an opening area of the opening in the first state.

3. The manufacturing machine according to claim 2, wherein the powder chute is coupled to the tool holder and the workpiece holder and deformed between the first state and the second state in accordance with movement of at least one of the tool holder and the workpiece holder.

4. The manufacturing machine according to claim 1, wherein the manufacturing machine further comprises a headstock, the headstock including:

a spindle having a rotational axis extending in a horizontal direction, the spindle holding the workpiece rotatably about the rotational axis; and a pedestal supporting the spindle, and the powder chute is held below the spindle during subtractive manufacturing.

5. A manufacturing machine capable of additive manufacturing, the manufacturing machine comprising:

a splashguard defining a machining area;

an additive-manufacturing head configured to be movable in the machining area and to discharge material powder toward a workpiece and irradiate the workpiece with an energy beam; and a powder chute having an opening which opens in the machining area, the powder chute being configured to be movable in the machining area and to receive material powder through the opening, the material powder being discharged from the additive-manufacturing head toward the workpiece and failing to attach to the workpiece; and a workpiece holder configured to be movable in the machining area and to hold the workpiece, and the powder chute being made movable in the machining area by being coupled to the workpiece holder.

* * * * *